(12) United States Patent
Gresset et al.

(10) Patent No.: US 7,675,847 B2
(45) Date of Patent: Mar. 9, 2010

(54) HARDWARE IMPLEMENTATION OF A PROGRAMMABLE FFT BASED ON A HALF LENGTH FFT CORE

(75) Inventors: Nicolas Gresset, Cesson Sevigne (FR); Nicolas Tribie, Antibes (FR)

(73) Assignee: WIPRO Limited, Bangalore, Karnataka (IN)

( * ) Notice: Subject to any disclaimer, the term of this patent is extended or adjusted under 35 U.S.C. 154(b) by 316 days.

(21) Appl. No.: 11/775,241

(22) Filed: Jul. 10, 2007

(65) Prior Publication Data

US 2009/0016211 A1  Jan. 15, 2009

(51) Int. Cl.
*H04J 11/00* (2006.01)

(52) U.S. Cl. .................... 370/210; 370/334; 708/404

(58) Field of Classification Search ................ 370/210, 370/334; 708/404
See application file for complete search history.

(56) References Cited

U.S. PATENT DOCUMENTS

| | | | |
|---|---|---|---|
| 5,371,696 A | 12/1994 | Sundararajan et al. |
| 5,430,667 A | 7/1995 | Takano |
| 5,481,488 A | 1/1996 | Luo et al. |
| 5,491,652 A | 2/1996 | Luo et al. |
| 5,633,817 A | 5/1997 | Verhenne et al. |
| 5,717,620 A | 2/1998 | Williams |
| 5,831,883 A | 11/1998 | Suter et al. |
| 5,883,713 A | 3/1999 | Davis et al. |
| 5,890,098 A | 3/1999 | Kozaki et al. |
| 6,006,245 A | 12/1999 | Thayer |
| 6,061,705 A | 5/2000 | Hellberg |
| 6,081,821 A | 6/2000 | Hopkinson et al. |
| 6,098,088 A | 8/2000 | He et al. |
| 6,157,938 A | 12/2000 | Wu et al. |
| 6,230,176 B1 | 5/2001 | Mizutani |
| 6,240,062 B1 | 5/2001 | Kozaki et al. |
| 6,263,356 B1 | 7/2001 | Kozaki et al. |
| 6,330,580 B1 | 12/2001 | Giaume et al. |
| 6,366,936 B1 | 4/2002 | Lee et al. |
| 6,366,937 B1 | 4/2002 | Shridhar et al. |
| 6,434,583 B1 | 8/2002 | Dapper et al. |
| 6,477,554 B1 | 11/2002 | Aizenberg et al. |
| 6,490,672 B1 | 12/2002 | Aizenberg et al. |
| 6,532,484 B1 | 3/2003 | Kechriotis |
| 6,549,925 B1 | 4/2003 | Amrany et al. |
| 6,615,227 B2 | 9/2003 | Aizenberg et al. |
| 6,629,117 B2 | 9/2003 | Aizenberg et al. |

(Continued)

*Primary Examiner*—Derrick W Ferris
*Assistant Examiner*—Christopher R Crompton
(74) *Attorney, Agent, or Firm*—Prakaash Nama; Global IP Services, PLLC

(57) ABSTRACT

A method of designing a IEEE 802.11n modem starting from a IEEE 802.11a/g modem using a programmable FFT (Fast Fourier Transform) based on a half length FFT core, modifies data in a reception chain implemented in a IEEE 802.11n standard application. The method uses a N/2 FFT which is validated, along with a wrapper; and, extends and applies the validated N/2 FFT, (e.g., 64 FFT) to a N FFT (e.g., 128 FFT) by splitting the N FFT into two smaller first and second FFTs. The first FFT is applied to selected data samples (e.g., even samples) from the N FFT and the second FFT is applied to remaining data samples (e.g., odd samples) from the N FFT to complete data-handling, wherein the extending step is based on Danielson-Lanczos formula using a reduced number of Cordics. The method is also suitable for IFFT computations in IEEE 802.11n MIMO OFDM modem designs.

18 Claims, 3 Drawing Sheets

U.S. PATENT DOCUMENTS

| | | | |
|---|---|---|---|
| 6,658,441 B1 | 12/2003 | Kim | |
| 6,751,643 B2 | 6/2004 | Jaber | |
| 6,792,441 B2 | 9/2004 | Jaber | |
| 6,839,728 B2 | 1/2005 | Pitsianis et al. | |
| 6,859,816 B2 | 2/2005 | Makino et al. | |
| 6,938,064 B1 | 8/2005 | Jalali et al. | |
| 6,963,891 B1 | 11/2005 | Hoyle | |
| 6,963,892 B2 | 11/2005 | Jin et al. | |
| 6,970,577 B2 | 11/2005 | Han | |
| 6,993,547 B2 | 1/2006 | Jaber | |
| 7,024,443 B2 | 4/2006 | Davey et al. | |
| 7,027,489 B2 | 4/2006 | Pan et al. | |
| 7,062,523 B1 | 6/2006 | Hoffman et al. | |
| 2005/0278405 A1* | 12/2005 | Jaber | 708/404 |
| 2007/0073796 A1* | 3/2007 | Meilhac et al. | 708/404 |
| 2009/0041153 A1* | 2/2009 | Kamerman et al. | 375/267 |

* cited by examiner

HARDWARE IMPLEMENTATION OF A PROGRAMMABLE FFT BASED ON A HALF LENGTH FFT CORE

FIELD OF THE INVENTION

This invention generally relates to hardware implementation of a FFT in the IEEE 802.11n standard for processing data, and more particularly to processing of data in the context of IEEE 802.11n MIMO (Multiple Input Multiple Output) modem applications.

BACKGROUND OF THE INVENTION

A brief discussion of the terminology and context of certain terms used herein is believed to be conducive to a more complete understanding of the present invention. Any reference herein to 802.11 is to be understood as referring to IEEE 802.11.

802.11n can be viewed as an extension to 802.11a, and was deliberated upon by the 802.11 Task Group "n", late in the year 2003 to address modifications to the PHY layer and Medium Access control Layer (PHY/MAC) to ensure a delivery of a maximum of even 600 megabits per second (Mbps) at PHY level.

Cordics is an algorithm for calculating hyperbolic and trigonometric functions (including Sine-Cosine functions, magnitude and phase). Known in binary form since at least 1959, in the presently known applications is faster than a hardware multiplier, and is well suited to hardware, and needs no multipliers.

WLANs are relevant in the context of IEEE 802.11n standard for processing data. The main attraction of WLANs is their flexibility. They can extend access to local area networks, such as corporate intranets, as well as support broadband access to the Internet—particularly at "hot spots," public venues which users tend to access. WLANs can provide quick, easy wireless connectivity to computers, machinery, or systems in a local environment where a fixed communications infrastructure does not exist or where such access may not be permitted. These WLAN hosts can be stationary, handheld, or even mounted on a moving vehicle. Bandwidth considerations have thus far been rather secondary in WLAN design and implementation in that the original 802.11 standard allowed a maximum channel bit rate of only 2 megabits per second, while the current 802.11 b standard supports an 11 Mbps maximum rate. However, the widespread deployment of 802.11a and 802.11g standards, which allow a bit rate of up to 54 Mbps, are conducive to new types of mobile applications, including m-commerce transactions and location-based services.

Current IEEE 802.11 wireless local area network (WLAN) standard products can provide up to 54 Mbps raw transmission rate, while non-standard WLAN products with 108 Mbps are known in the market, and the next generation WLAN might provide much higher transmission rates. However, originally the MAC (Medium Access Control) was designed for lower data rates, such as 1-2 Mbps, and it is relatively not an efficient MAC. Furthermore, a theoretical throughput limit exists due to overhead and limitations of physical implementations and therefore increasing the transmission rate may not help significantly, whereby, designing efficient MAC strategies becomes critical and useful. Efficient and improved new MACs assist not only current IEEE 802.11 standards (.11a/.11b/.11g), but also the next generation WLAN with higher speed and higher throughput, especially in IEEE 802.11n applications.

IEEE 802.11n as a new standardization effort is an amendment to IEEE 802.11 standards that is capable of much higher throughputs, with a maximum throughput of at least 100 Mb/s, as measured at the medium access control data services access point. The IEEE 802.11n will provide both physical layer and MAC enhancements.

The use of FFT algorithms in the handling of data in the IEEE 802.11n transmission chain is generally useful, but known techniques of handling data using FFT algorithms pose certain limitations. The reception chain implemented in the 802.11n standard uses either a 64 points FFT or a 128 points FFT without any inherent flexibility therebetween. There is a need to address the flexibility-aspect of the 802.11n implementation.

SUMMARY OF THE INVENTION

The reception chain implemented in the 802.11n standard uses a 64 points or a 128 points FFT, depending on the used channel bandwidth (20 or 40 MHz). The time allowed for this computation is generally only 4 us, therefore a hardware implementation is preferred. It has to be programmable to do the transformation of a 64 or 128 samples vector. The present solution offers this flexibility, by using a 64 FFT core and a wrapper, and some additional control logic. More generally, the invention can be applied to any case where a N-FFT is needed and a N/2-FFT is already available and tested.

This above innovation is very well suited when designing a 802.11n MIMO OFDM modem, starting from a 802.11.a/g OFDM modem, which makes use of a 64 FFT. It allows reusing this block and speed up the design and verification phase. The wrapper can be easily implemented and verified, so it can take advantage of all the validation effort already spent on the 64 FFT.

In one form, the present invention uses the FFT algorithm which belongs to the state of the art. However, the extension from a 64-FFT to a 128-FFT is based on the Danielson-Lanczos formula, which, applied recursively, is at the origin of the FFT algorithm itself. The approach in the present invention is to split the size-N FFT into 2 smaller FFTs of size N/2. In a preferred form of the invention, first FFT will be applied on the even samples, and the second FFT to the odd samples. The first and second FFTs may be applied in other alternative ways instead.

It is noted that the present invention is also suitable for IFFT (Inverse FFT) computation in the 802.11n transmission chain.

The invention in one form resides in a method of modifying data in a reception chain implemented as an extension of IEEE 802.11n standard by a hardware implementation of a programmable FFT (Fast Fourier Transform) comprising the steps of: using a N/2 FFT which is validated, along with a wrapper; and, extending and applying the validated N/2 FFT to a N FFT by splitting the N FFT into two smaller first and second FFTs, and applying said first smaller FFT to selected data samples from the N FFT and applying said second FFT to remaining data samples from the N FFT to complete handling the data.

The invention in another form resides in a method of designing a IEEE 802.11n modem starting from a IEEE 802.11a/g modem using a programmable FFT (Fast Fourier Transform) based on a half length FFT core, by modifying data in a reception chain implemented in a IEEE 802.11n standard application, comprising the steps of: using a 64 FFT core which is validated, along with a wrapper; and, extending and applying the validated 64 FFT to a 128 FFT by splitting the 128 FFT into two first and second 64 FFTs, and applying said first 64 FFT to selected data samples from the 128 FFT and applying said second 64 FFT to remaining data samples from the 128 FFT to complete handling said data, wherein said step of extending is based on Danielson-Lanczos formula.

The invention also encompasses a computer readable medium encoded with data/instruction which when executed by a computing platform results in execution of a method of hardware implementation of a programmable FFT (Fast Fourier Transform) based on a half length FFT core, by modifying data in a reception chain implemented in a IEEE 802.11n standard MIMO OFDM modem application, comprising the steps of: using a N/2 FFT which is validated, along with a wrapper; and, extending and applying the validated N/2 FFT to a N FFT by splitting the N FFT into two smaller first and second FFTs, and applying the first smaller FFT to selected data samples from the N FFT and applying the second FFT to remaining data samples from the N FFT to complete handling the data, wherein the step of extending is based on Danielson-Lanczos formula, including the step of processing the data and computing multiplication by $W^i$, {where $W^i$=exp$(-2*i*PI/N)$} coefficients using a predetermined reduced number of Cordics.

BRIEF DESCRIPTION OF THE DRAWING

A more detailed understanding of the invention may be had from the following description given by way of example and to be understood in conjunction with the accompanying drawing wherein.

DETAILED DESCRIPTION OF THE INVENTION

Figure 1:
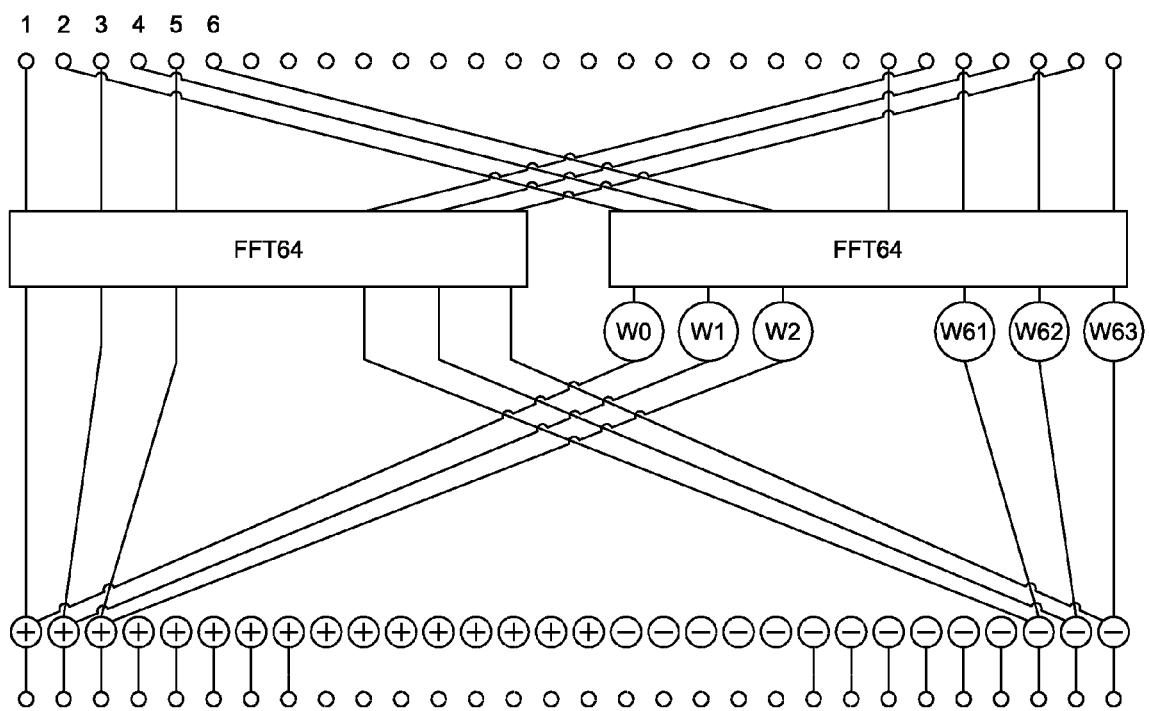
FIG. 1 illustrates extended FFT dataflow as applied in the present method.

A detailed description of one or more embodiments of the invention is provided below in the context of the accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention.

The present invention may be practiced according to the claims without some or all of these specific details. For the purpose of clarity, technical material that is known in the technical fields related to the invention has not been described in detail so that the present invention is not unnecessarily obscured.

One embodiment of the present invention uses optimized way of processing the data and computing the multiplication by $W^i$ coefficients using a reduced number of Cordics.

The data whose FFT/IFFT is computed is first stored in a memory. Expediently, the FFT128 module uses one half of the memory, comprising 16 rows of data, for internal processing and intermediate results storage. Once the FFT/IFFT is complete, the output samples are written back to the same memory space. At the same time, the other half is used to store the incoming time domain samples.

Once the memory is filled, the $1^{st}$ FFT64 computation starts, its output is stored back in the memory. Then the second FFT64 computation starts. Its output is multiplied by $W^i$ coefficients (as will be explained later) using pipelined Cordics, combined with previously stored FFT64 result, and stored back in the memory.

A specific memory organization enables deriving the benefit from the short FFT64 latency by feeding and reading its 8 butterflies in parallel. The present approach takes advantage of the existing 64-FFT design which has been silicon proven. Moreover the proposed scheme is particularly suited for a block that needs to compute 64 and 128 FFTs. In contrast, previous solutions would have required a complete new FFT block design.

It is noted that the present design approach is very useful in WLAN—802.11n modem applications especially when starting from an existing 802.11a/b/g modem implementing a proven FFT 64.

It is also noted that any 802.11n modem IP customer will get a synthesizable Verilog RTL description of the FFT block, and its associated documentation and test environment. Some customers could also get the Matlab code.

More specifically, FIG. 1 shows the conceptual dataflow of the extended FFT128, using two FFT64. Odd samples (1,3, . . . to 127) feed the first FFT64 computation block, denoted "odd FFT64" in the rest of this text. Even samples (2,4, . . . to 128) feed the second one, denoted "even FFT64". Then each of the $i^{th}$ complex number resulting from the even FFT64 is multiplied by a coefficient $W^i$, where $W^i$=exp$(-2*i*PI/128)$. For each coefficient, the result of this complex multiplication is then added to the corresponding $i^{th}$ complex result of the odd FFT64. For clarity reasons, only a few branches of this dataflow diagram are shown in the figure. In the present implementation, this multiplication is performed efficiently owing to reduced numbers of Cordic blocks using precomputed angles.

Figure 2:
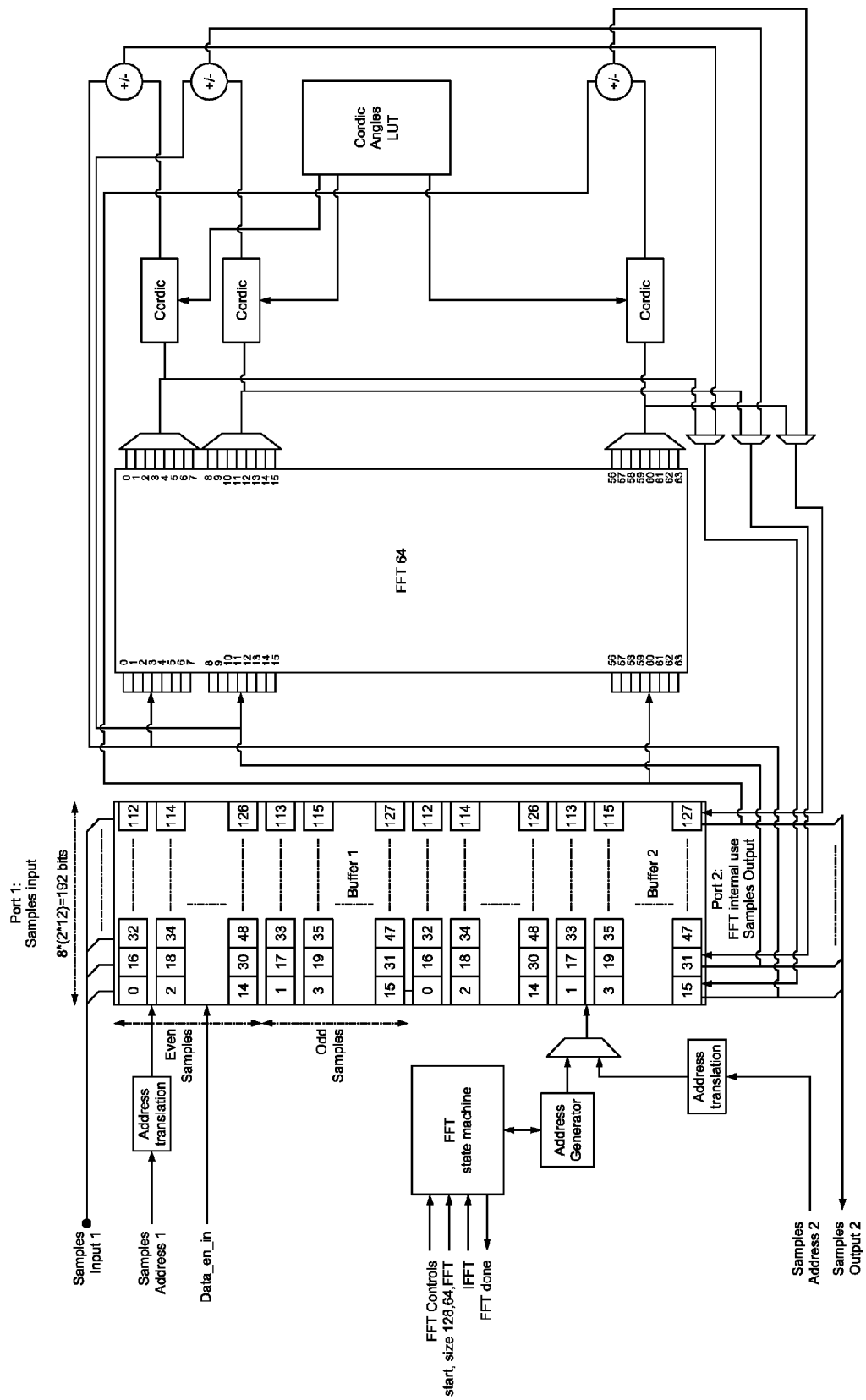
FIG. 2 illustrates the implementation of data flow in a global schematic of an embodiment of the present invention; and, FIG. 3 illustrates an exemplary FFT sequencing in one application of the invention.

The global schematic of an embodiment of the present invention is illustrated in FIG. 2.

More specifically, FIG. 2 describes the implementation of the dataflow described hereinabove. It includes:

A dual port memory storing two sets of 128 complex coefficients with 12 bits of precision, A block performing the radix-8 FFT 64, able to process eight coefficients at a time, Eight pipelined Cordics blocks (for clarity only three are drawn in FIG. 2). These Cordics perform one complex multiplication per cycle.

A ROM storing precomputed rotations to be performed by the Cordics in a lookup table (LUT), A finite state machine (FSM), controlling the dataflow sequencing, Eight adders, Several multiplexers per data line to route the data between modules, according to the sequencing defined by the FSM; and, An address generator, responsible for generating the address where to store and retrieve the complex samples in the dual port memory, using a specific scheme.

The complex samples whose FFT or IFFT is computed are preferably stored in a dual port memory, using the first port. This memory is used in a double buffer scheme, that is, a new set of samples can be filled in, while the FFT is computed. In IFFT mode, this scheme allows the invention to generate time domain samples without interruptions.

The even (2,4, ..., 128) samples are transferred from the memory to the FFT64 block under the FSM control. A specific organization of the samples in the memory allows transferring eight samples in a single cycle, using only one of the two memory ports.

The even FFT64 computation is triggered by the FSM. When done, the eight Cordics perform the multiplication of the even FFT64 outputs by the coefficients $W^i$, as shown in FIG. 1. The results of these multiplications are fed back into the memory.

Then, the odd samples (1,3, ..., 127) are transferred to the FFT64, and the same process restarts. This time the result of the odd FFT64 are combined with the results stored during the previous step, and fed back to the memory.

At this stage, the FFT128 is complete; the results are available in the memory, to be read sequentially through a sample data output port. At the same time, a new FFT128 computation can be launched.

Figure 3:
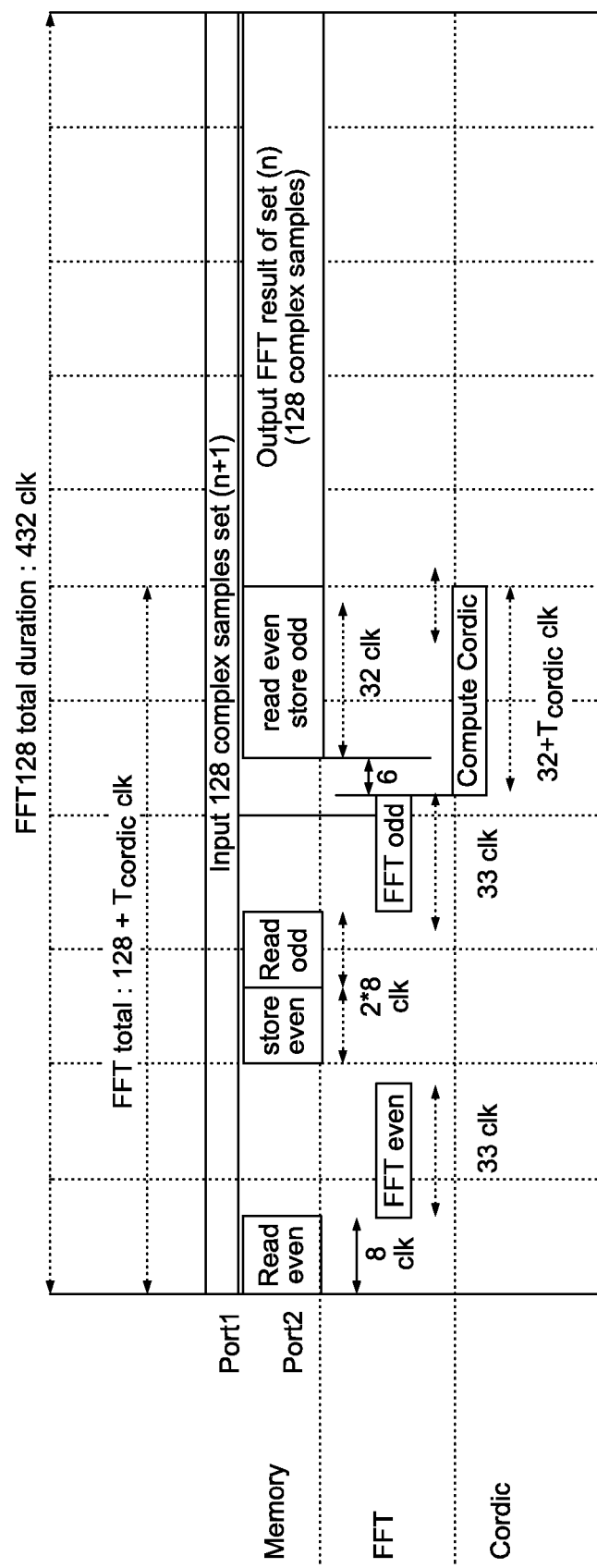

FIG. 3 depicts the complete sequencing of one FFT 128 computation, and the number of cycles (clk) required by each operation or data transfer. It also shows the activity of the main components of the FFT128 module: the dual-port memory, the FFT64, and the eight Cordics. Note that, due to the pipeline the Cordics require extra time for the first multiplication, this time is denoted $T_{cordic}$ on the figure.

The present invention includes a computer readable medium encoded with software data/instruction which when executed by a computing platform would result in execution of a method re-using the 64 FFT blocks, and additionally a wrapper, control logic, the Cordics and shared memory organization, as described and claimed herein. Different embodiments of the present subject matter can be implemented through hardware implementation of software which can be used in any suitable computing environment. The embodiments of the present subject matter are also operable in a number of general-purpose or special-purpose computing environments, or processors or processing units. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium or computer memory elements. The embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

The present approach requires rewritable fast memory means to meet the requirements of 802.11n, e.g., SRAM, SDRAM. The computer memory elements may further include any suitable non-transitory memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as referred to hereinabove, includes a data path which is hardwired and preferably controlled by a state machine(FSM) and may include a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

In the foregoing detailed description of embodiments of the invention, various features are grouped together in a single exemplary embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should therefore be determined with reference to the appended claims, along with the full scope of equivalents to which such claims are entitled. In the appended claims, the terms "including" and "in which" where present, are used as the plain-English equivalents of the respective terms "comprising" and "wherein," respectively. Moreover, the terms "first," "second," and "third," etc., if used, are merely labels, and are not intended to impose numerical requirements on their objects.

The invention claimed is:

1. A method of modifying data in a reception chain implemented in IEEE 802.11n standard by a hardware implementation of a programmable Fast Fourier Transform (FFT) comprising the steps of:

using a programmable N/2 FFT which is validated, along with a wrapper;

first storing the data in a memory wherein the N FFT is applied in a FFT 128 module comprising 16 rows of data consuming one half of the memory and using a second half of the memory to store incoming time domain samples, wherein after the memory is filled, the method including the step of starting a first FFT 64 step computation and storing its output back in the memory, starting a second FFT 64 step computation and multiplying its output by $W^i$, {where $W^i$=exp (−2*i*PI/128)} coefficients using pipelined Cordics, combining with a previously stored FFT 64 computation result and storing a combined result back in the memory; and extending and applying the validated programmable N/2 FFT to a N FFT by splitting the N FFT into two smaller first and second FFTs, and applying said first smaller FFT to selected data samples from the N FFT and applying said second FFT to remaining data samples from the N FFT to complete handling said data.

2. A non-transitory computer readable medium encoded with data/instruction which when executed by a computing platform results in execution of a method as in claim 1.

3. The method as in claim 1, wherein said step of extending is based on Danielson-Lanczos formula.

4. The method as in claim 1 wherein said step of applying said first smaller FFT comprises applying said first smaller FFT to even numbered samples from said N FFT and applying said second FFT to odd numbered samples from the N FFT.

5. The method as in claim 1 applied to IEEE 802.11 transmission through an IFFT (Inverse FFT).

6. The method as in claim 1 applied to IEEE 802.11 transmission in a MIMO OFDM (Multiple Input Multiple Output Orthogonal Frequency Division Multiplexing) modem in Wireless Local Area Network (WLAN) applications.

7. The method as in claim 1 including the step of using additional control logic for implementing said step of extending the validated N/2 FFT and implementing steps of applying the smaller FFTs to said data samples.

8. The method as in claim 1 including the step of processing said data and computing multiplication by $W^i$, {where $W^i$=exp $(-2*i*PI/128)$} coefficients using a predetermined reduced number of Cordics.

9. The method as in claim 1 including the step of storing said data in a memory before FFT computation, obtaining output samples from the FFT computation and writing said samples back to said memory.

10. A method of hardware implementation of a programmable Fast Fourier Transform (FFT) based on a half length FFT core, by modifying data in a reception chain implemented in a IEEE 802.11n standard application, comprising the steps of:

using a programmable N/2 FFT which is validated, along with a wrapper;

storing said data in a memory before FFT computation, obtaining output samples from the FFT computation and writing said samples back to said memory, wherein after the memory is filled, the method including the step of starting a first FFT 64 step computation and storing its output back in the memory, starting a second FFT 64 step computation and multiplying its output by $W^i$, {where $W^i$=exp $(-2*i*PI/128)$} coefficients read from a precomputed look up table (LUT), using a reduced number of pipelined Cordics, combining with a previously stored FFT 64 computation result and storing a combined result back in the memory, while meeting 802.11 latency requirements; and, extending and applying the validated programmable N/2 FFT to a N FFT by splitting the N FFT into two smaller first and second FFTs, and applying said first smaller FFT to selected data samples from the N FFT and applying said second FFT to remaining data samples from the N FFT to complete handling said data, wherein said step of extending is based on Danielson-Laneczos formula.

11. The method as in claim 10 wherein said N/2 FFT corresponds to a 64 FFT core.

12. The method as in claim 10, wherein said step of applying said first smaller FFT comprises applying said first smaller FFT to even numbered samples from said N FFT and applying said second FFT to odd numbered samples from the N FFT.

13. The method as in claim 10 applied to IEEE 802.11 transmission through an Inverse FFT (IFFT).

14. The method as in claim 10 applied to IEEE 802.11 transmission in a MIMO OFDM modem in Wireless Local Area Network (WLAN) applications.

15. The method as in claim 10 including the step of using additional control logic for implementing said step of extending the validated N/2 FFT and implementing steps of applying the smaller FFTs to said data samples.

16. The method as in claim 10 including the step of processing said data and computing multiplication by $W^i$, {where $W^i$=exp $(-2*i*PI/128)$} coefficients using a predetermined reduced number of Cordics.

17. The method as in claim 16 including the step of storing said data in a memory before FFT computation, obtaining output samples from the FFT computation and writing said samples back to said memory.

18. A method of designing a IEEE 802.11n modem starting from a IEEE 802.11a/g modem using a programmable Fast Fourier Transform (FFT) based on a half length FFT core, by modifying data in a reception chain implemented in a IEEE 802.11n standard application, comprising the steps of:

using a programmable 64 FFT core which is validated, along with a wrapper;

storing said data in a memory before FFT computation, obtaining output samples from the FFT computation and writing said samples back to said memory, wherein after the memory is filled, the method including the step of starting a first FFT 64 step computation and storing its output back in the memory, starting a second FFT 64 step computation and multiplying its output by $W^i$, {where $W^i$=exp $(-2*i*PI/128)$} coefficients read from a precomputed look up table (LUT), using a reduced number of pipelined Cordics, combining with a previously stored FFT 64 computation result and storing a combined result back in the memory, while meeting 802.11 latency requirements; and, extending and applying the validated programmable 64 FFT to a 128 FFT by splitting the 128 FFT into two first and second 64 FFTs, and applying said first 64 FFT to selected data samples from the 128 FFT and applying said second 64 FFT to remaining data samples from the 128 FFT to complete handling said data, wherein said step of extending is based on Danielson-Lanczos formula.

* * * * *

UNITED STATES PATENT AND TRADEMARK OFFICE
CERTIFICATE OF CORRECTION

PATENT NO. : 7,675,847 B2  Page 1 of 1
APPLICATION NO. : 11/775241
DATED : March 9, 2010
INVENTOR(S) : Nicolas Gresset et al.

It is certified that error appears in the above-identified patent and that said Letters Patent is hereby corrected as shown below:

Title Page item 74

Attorney, Agent, or firm should read as:

Prakash Nama; Global IP Services, PLLC

In Claims:

In Claim 10, column 7, line 55 change

"Laneczos" to "Lanczos"

Signed and Sealed this

Fifteenth Day of June, 2010

David J. Kappos
*Director of the United States Patent and Trademark Office*